United States Patent [19]
Garrett
[11] 3,823,338
[45] July 9, 1974

[54] CATHODE-RAY TUBE NON-LINEARITY CORRECTION CIRCUIT

[75] Inventor: John I. Garrett, Ogallala, Nebr.
[73] Assignee: Honeywell Inc., Minneapolis, Minn.

[22] Filed: Oct. 3, 1972
[21] Appl. No.: 294,604

[52] U.S. Cl. .......... 315/276 D
[51] Int. Cl. .......... H01j 29/70
[58] Field of Search .......... 315/27 R, 27 TD, 27 GD, 315/27 SR

[56] References Cited

UNITED STATES PATENTS 3,422,306 1/1969 Gray .......... 315/27 GD
3,452,243 6/1969 Knorr .......... 315/276 D

*Primary Examiner*—Malcolm F. Hubler
*Assistant Examiner*—J. M. Potenza
*Attorney, Agent, or Firm*—Arthur H. Swanson; Lockwood D. Burton; Mitchell J. Halista

[57] ABSTRACT

A non-linearity, or barrel-effect, distortion of a cathode-ray tube display is corrected by deriving a first input signal for a multiplier circuit from a horizontal ramp signal by a full-wave rectification and level-shifting process to extract two predetermined portions of the ramp signal connected by a zero level signal. The first input signal is multiplied by a second input signal obtained from a vertical drive signal for the cathode-ray tube, and the resulting product signal is added to the original vertical drive signal to obtain a modified vertical drive signal.

6 Claims, 7 Drawing Figures

CATHODE-RAY TUBE NON-LINEARITY CORRECTION CIRCUIT

BACKGROUND OF THE INVENTION

The use of a cathode-ray tube as a display device has a number of beneficial attributes such as enabling high-speed electrical phenomena to be observed and providing an output device for a digital computer without the need for printing temporary or repetitive computational results. However, the display on the cathode-ray tube display face is affected by several non-linearity effects produced by the sweep of an electron beam across the display face. One of the most troublesome of these non-linear effects is characterized by the diminishing of the amplitude of the ends of a display waveshape with respect to the amplitude of the center of the display waveshape. Thus, a constant amplitude input signal waveshape would be displayed on the display face with a constant waveshape amplitude in the center of the display face and a gradual decline to a smaller waveshape amplitude at both ends of the display waveshape, i.e., the distortion is proportional to the deflection from the center of the display face. This type of distortion is commonly referred to as a "barrel-effect" distortion. Accordingly, in order to accurately portray a waveshape on the display face of a cathode-ray tube, it is desirable to eliminate the "barrel-effect" distortion of the displayed waveshape. Prior art attempts to eliminate this type of non-linear distortion have used either permanent magnets or specially shaped deflection coils to alter the path of the electron beam in the cathode-ray tube. Such prior art non-linearity correction techniques are subject to the accuracy of the placement of the magnets and coils which are easily disturbed from a correct setting. Further, they provide only a fixed average correction effect since they are not related to the actual sweep or deflection of the electron beam and do not provide a corrective action which varies in proportion with the magnitude of the distortion.

An object of the present invention is to provide an improved "barrel-effect" correction means for a cathode-ray tube.

Another object of the present invention is to provide an improved non-linearity correction circuit for a cathode-ray tube display for automatically correcting "barrel-effect" distortion in proportion to the magnitude of the distortion.

SUMMARY OF THE INVENTION

In accomplishing these and other objects, there has been provided, in accordance with the present invention, a non-linearity correcting circuit for a cathode-ray tube including a full-wave rectifying means for rectifying a horizontal ramp signal, means for selecting predetermined portions of the rectified ramp signal while providing a fixed level signal between said predetermined portions, vertical drive means arranged to produce a vertical drive signal in response to an input signal to be displayed on said cathode-ray tube, multiplier means for producing a product signal, circuit means for applying an output signal from the means for selecting and a vertical drive signal from the vertical drive means to the multiplier means to be multiplied and adder means arranged to add a product signal from the multiplier means to the vertical drive signal to form a modified vertical drive signal for the cathode-ray tube.

BRIEF DESCRIPTION OF THE DRAWINGS

A better understanding of the present invention may be had when the following detailed description is read in connection with the accompanying drawings in which.

DETAILED DESCRIPTION

Figure 1:
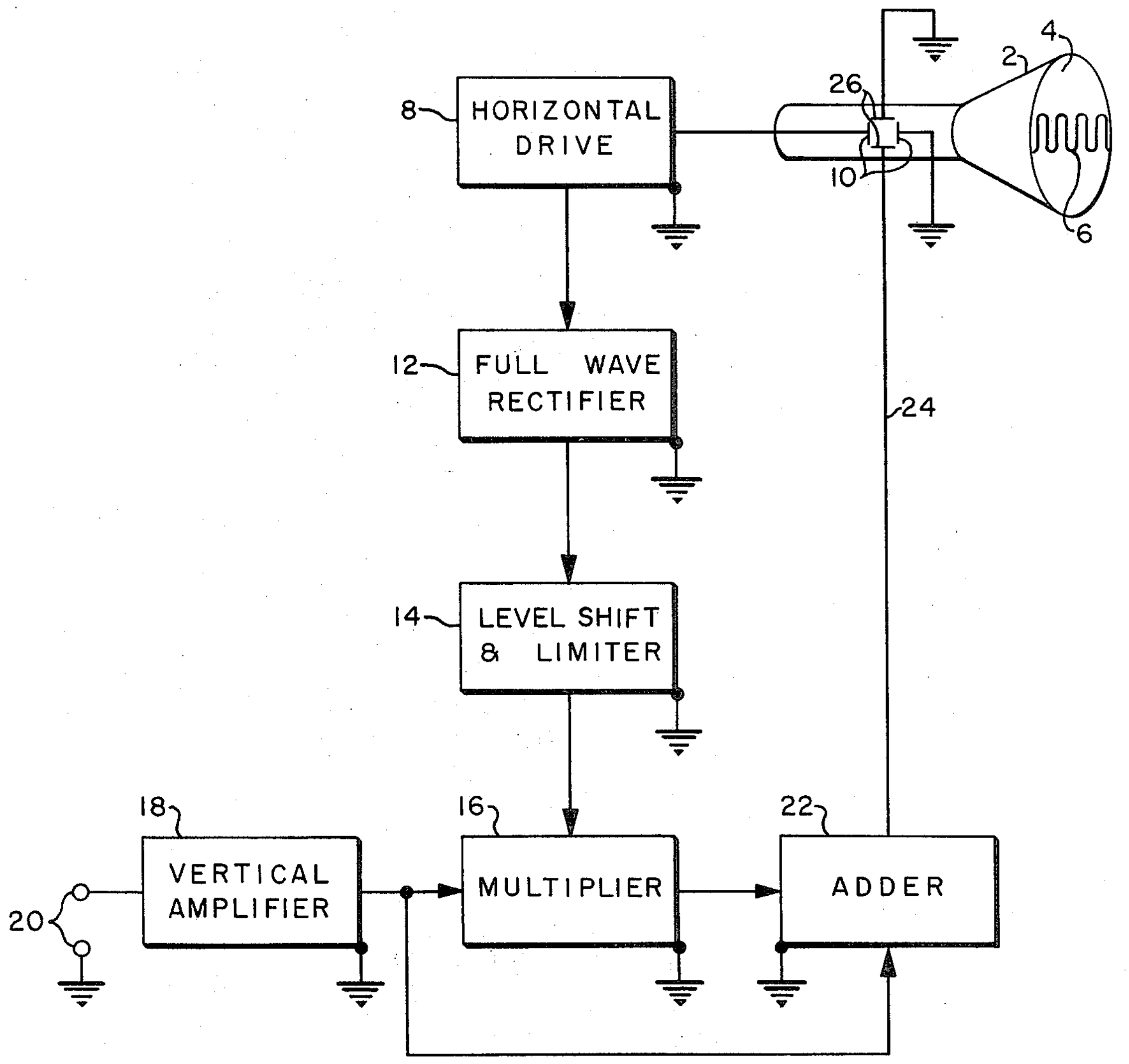
FIG. 1 is a block diagram of a cathode-ray tube non-linearity correction circuit embodying the present invention.
Figure 2A:
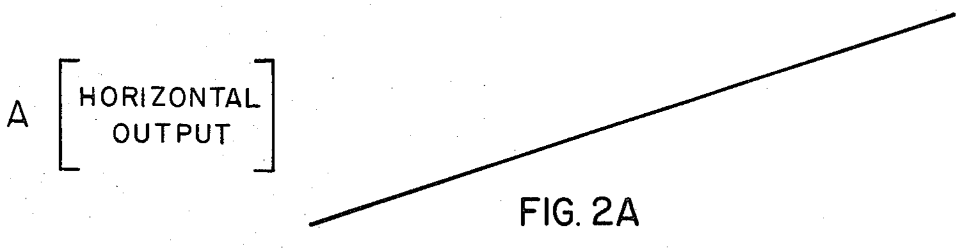
FIG. 2A to 2F is a pictorial illustration of the wave shapes associated with the circuit shown in FIG. 1.
Figure 2B:
Figure 2C:
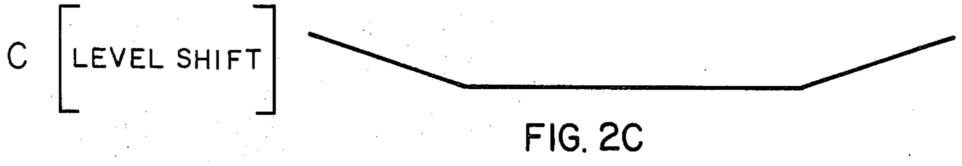
Figure 2D:
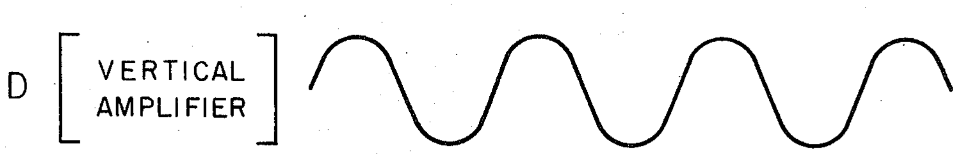
Figure 2E:
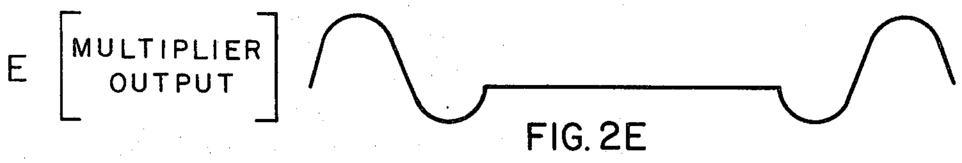
Figure 2F:
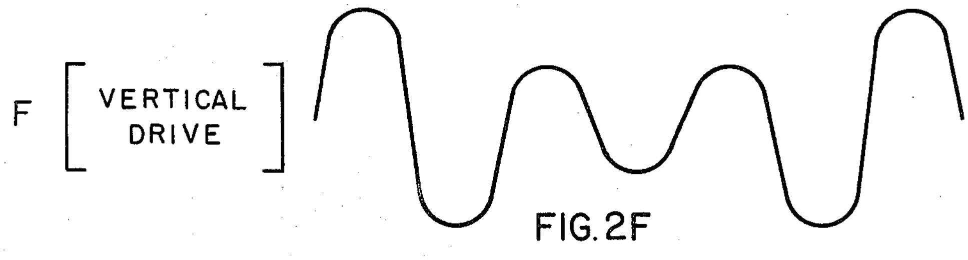

Referring to FIGS. 1 and 2 in more detail, there is shown a cathode-ray tube non-linearity correcting circuit for use with a cathode-ray tube, hereinafter referred to as CRT 2, having a display face 4 for displaying a wave shape 6 thereon. A horizontal drive means 8 is arranged to generate a conventional repetitive ramp signal as shown in waveshape A in FIG. 2A for driving a horizontal electron beam control means in the CRT 2, such as horizontal electrostatic deflection plates 10. An output signal from the horizontal drive means 8 representative of the aforesaid ramp signal is applied to a full-wave rectifier 12. An output signal from the full-wave rectifier 12 shown as waveshape B in FIG. 2B is applied to a level shift and limiter circuit 14 for producing an output signal having a waveshape as shown in waveshape C in FIG. 2C. The output signal of the level shift circuit 14 is applied to a multiplier circuit 16 which may be any suitable multiplier circuit for accepting two inputs and producing an output signal which is proportional to the product of the two inputs, e.g., a Motorola MC 1495L integrated circuit module produced by Motorola Semi-Conductor Products, Inc., Phoenix, Ariz. The output signal from the level shift circuit 14 provides a first input signal to the multiplier 16 while a second input signal to the multiplier 16 is obtained from the output signal of a vertical amplifier 18. The input signal to the vertical amplifier 18 is obtained from a pair of vertical input terminals 20 arranged to be connected to a source of an input signal to be displayed on the display face 4 of the CRT 2. The output signal from the vertical amplifier 18 is also applied to an adder or mixer circuit 22. An output signal from the multiplier 16 representing the product of the multiplier input signals, as shown in waveshape E of FIG. 2E, is, also, applied to the adder 22 to be combined with the vertical output signal from the vertical amplifier 18 to produce a vertical drive signal for the CRT 2 as shown in waveshape F of FIG. 2F. The output signal from the adder 22 is applied along a vertical drive line 24 to a vertical electron beam control means for the CRT 2, such as, vertical electrostatic deflection plates 26.

In operation, the addition by the adder 22 of the signal derived from the horizontal ramp signal and the vertical output signal to the unmodified vertical signal for driving the vertical control means of the CRT 2 is effective to produce an augmented version of the waveshape signal to be displayed on the dispaly face 4 of the CRT 2. Specifically the full-wave rectification of the ramp signal as shown in waveshape B is effective to produce two triangular waveshapes of the same polarity and being mirror-images with respect to the zero-crossing of each of the horizontal ramp signals, as shown in waveshape A. By a level-shift of the rectified waveshape obtained by limiting the waveshape to a fixed level over part of its amplitude whereby the average level of the waveshape is shifted, a new waveshape is obtained, as shown in waveshape C, having a zero level over a substantial center portion thereof while retaining a portion of rectified, or limited, signal at both ends thereof. When this level-shifted signal is multiplied by multiplier 16 with the vertical drive signal, shown in waveshape D, the zero level center produces a zero level product signal while the end portions produce a product signal representative of a modified vertical drive signal dependent on the relative amplitudes and polarities as shown in waveshape E. The addition of the product waveshape E to the original vertical drive signal shown in waveshape D produces an augmented vertical drive signal, as shown in waveshape F, from the adder 22. Since the effect of the multiplication of the two signals by the multiplier 16 is limited to the end of the waveshape 6 on the face plate 4, the waveshape is linearized by eliminating the "barrel effect" which diminishes the height of the waveshape 6 at both ends thereof. As the non-linearity correcting effect is synchronized with the horizontal sweep, the waveshape correction is achieved in synchronism with the production of the waveshape 6 on the face plate 4 by the electron beam within the CRT 2 and the corrective action is proportional to the magnitude of the distortion.

Accordingly, it may be seen that there has been provided, in accordance with the present invention, a cathode-ray tube non-linearity correction circuit for automatically correcting a "barrel-effect" distortion of the waveshape displayed on a display face of the cathode-ray tube.

The embodiments of the invention in which an exclusive property or privilege is claimed are defined as follows:

1. A cathode-ray tube non-linearity correcting circuit comprising, a horizontal drive means arranged to produce a horizontal drive signal for the cathode-ray tube, full-wave rectifier means for producing a rectification of said horizontal drive signal, means for selecting a predetermined portion of said rectified horizontal drive signal, and signal modifying means arranged to be connected to a source of input signals to be displayed on the cathode-ray tube, said signal modifying means including means connected to said means for selecting and responsive to said predetermined portion of said rectified horizontal drive signal for modifying an input signal from the source of input signals in proportion to said predetermined portion of said rectified horizontal drive signal to produce a vertical drive signal for the cathode-ray tube.

2. A cathode-ray tube non-linearity correcting circuit as set forth in claim 1 wherein said means for selecting a predetermined portion is arranged to select at least two portions of said rectified horizontal drive signal while maintaining a fixed level signal between said portions.

3. A cathode-ray tube non-linearity correcting circuit as set forth in claim 2 wherein said signal modifying means includes a multiplier means, first circuit means arranged to apply said predetermined portions of said rectified horizontal drive signal from said means for selecting as a first input signal to said multiplier means, second circuit means arranged to apply said input signals as a second input signal to said multiplier means and summing means for summing an output signal from said multiplier with said input signals to produce said vertical drive signal.

4. A cathode-ray tube drive circuit as set forth in claim 2 wherein said fixed level signal is a zero level signal.

5. A cathode-ray tube drive circuit as set forth in claim 1 wherein said means for selecting include a level-shift means arranged to shift a reference level of said rectified horizontal drive output signal.

6. A cathode-ray tube drive circuit as set forth in claim 1 and including means to apply said output signal from said horizontal drive means to a horizontal deflection control means of a cathode-ray tube and means to apply said modified vertical drive signal to a vertical deflection control means of said cathode-ray tube.

* * * * *